Jan. 8, 1929.

R. VAN DUZER 1,698,613

FRUIT PRESSING MACHINE

Filed Aug. 10, 1927

Ralph Van Duzer
INVENTOR

BY Victor J. Evans
ATTORNEY

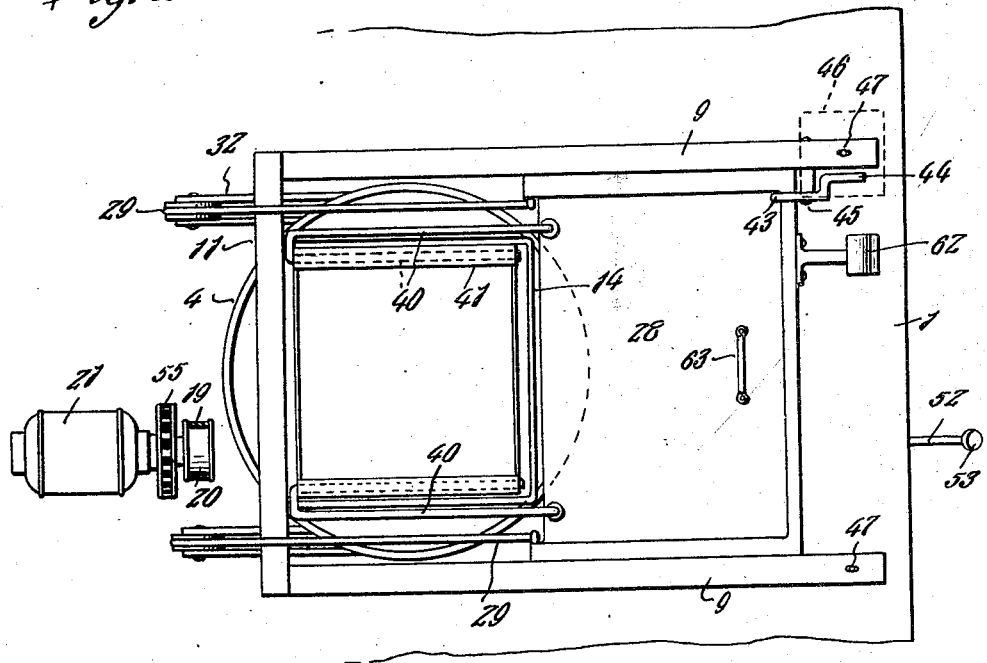
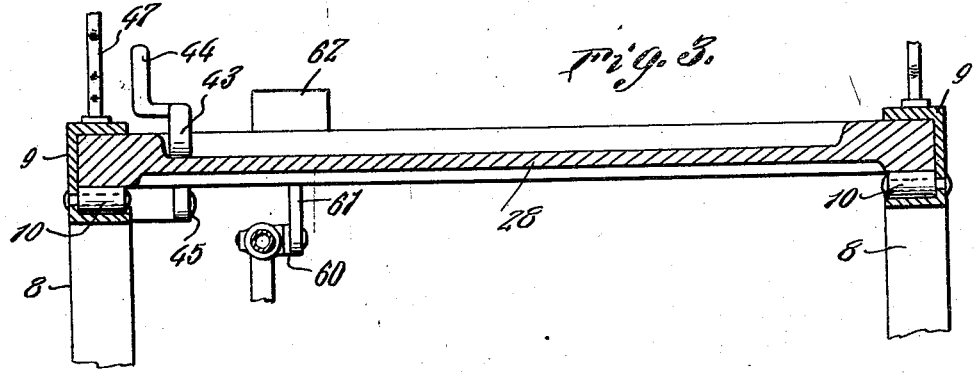
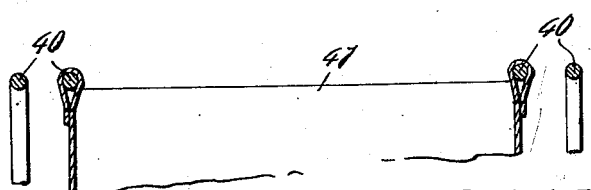

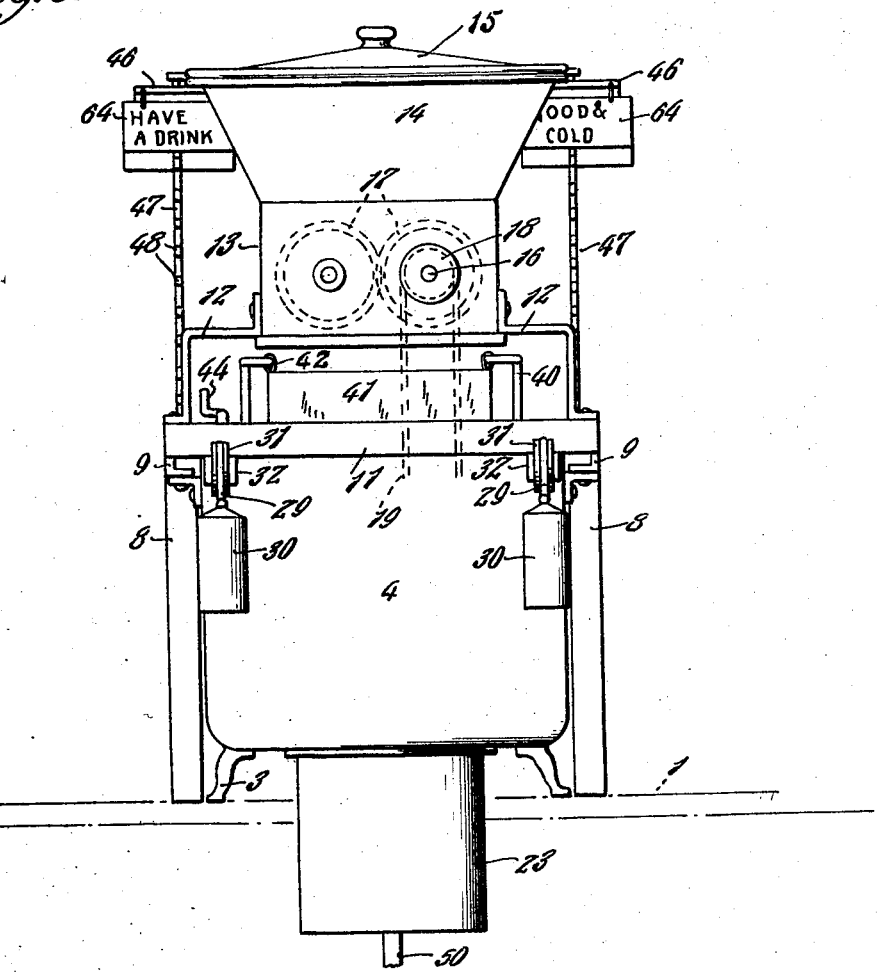

Patented Jan. 8, 1929.

1,698,613

UNITED STATES PATENT OFFICE.

RALPH VAN DUZER, OF GARY, WEST VIRGINIA.

FRUIT-PRESSING MACHINE.

Application filed August 10, 1927. Serial No. 212,077.

This invention relates to presses, and its general object is to provide a fruit juice dispensing machine that is adapted to receive whole fruit, and includes means for rendering the fruit to pulp with pressing means for the pulp to obtain its juice, and dispensing means for the juice.

A further object of the invention is to provide a fruit juice dispensing machine of the character above set forth, that is simple in construction, contains few parts, is semi-automatic in operation and is efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Fig. 1 is a view partly in section and in elevation of the machine which forms the subject matter of the present invention.

Figure 2 is a sectional view taken approximately on line 2—2 of Figure 1.

Figure 3 is a sectional view taken approximately on line 3—3 of Figure 1.

Figure 4 is a sectional view taken approximately on line 4—4 of Figure 1.

Fig. 5 is a fragmentary side elevation.

Fig. 6 is an enlarged sectional view taken through the timing block and showing a fragmentary portion of its retarding member.

Referring to the drawings in detail the reference numeral 1 indicates a platform provided with a front 2 and may have sides depending therefrom to form a counter or other like supporting means.

Supported upon the platform 1 through the instrumentality of legs 3 is a container 4 having a spigot 5 for dispensing the contents of the container. Disposed about the inlet end of the spigot 5 is a screen 6 for a purpose which will be apparent. An outlet valve 7 is also disposed in communication with the container below the spigot so that the container can be completely emptied if desired.

Rising from the forward end of the platform 1 are uprights 8 which have secured to their upper ends spaced parallel channel guides 9 having rollers 10 disposed in the bottoms thereof as best shown in Figure 3 of the drawings.

The channel guides 9 extend rearwardly and have their rear ends secured to a cross strip 11 which is supported upon the container 4.

Arranged above the container 4 and supported accordingly through the instrumentality of brackets 12 which have their lower ends fixed to the channel guides 9 and the bottom thereof is a fruit grinder which includes a body 13 and a hopper 14. The hopper is provided with a flanged cover 15. Passing through the body 13 and having their ends journaled in the walls thereof are spaced parallel shafts 16 having secured thereto toothed rollers 17 which cooperate to receive fruit therebetween for grinding and crushing up the latter as will be apparent. One of the shafts 16 projects a considerable distance beyond the body 13 and secured to this projecting end is a pulley 18 which receives a belt 19. The belt 19 is likewise received by a pulley 20 secured to the shaft of a motor 21 as shown. By this construction, the belt 19 will drive the pulley carrying shaft and due to the engagement of the teeth of the drum of this shaft with the teeth of the drum of the other shaft, it will be obvious that both of the drums will be rotated and crush fruit therebetween as above set forth.

A compression chamber is arranged in the container 4 and includes an enlarged portion 22 wholly disposed in the container, and a relatively small portion 23 which passes through the bottom of the container and terminates below the platform 1 as shown in Figure 1. The enlarged portion of the chamber is provided with a plurality of openings disposed in its vertical walls thereof, and arranged for slidable movement in the enlarged portion 22 is a piston head 24 which has depending therefrom a rod 25 and said rod is secured to a piston 26 disposed in the small portion 23 for slidable movement as will be apparent. The piston 26 is provided with an expansion ring 27.

Mounted on the rollers 10 for slidable movement in the channel guides 9 is a plate 28 which is provided with a flanged top and a recessed bottom. Secured to one of the end edges of said plate are a pair of cables 29 having weights 30 fixed thereto and said cables are trained over pulleys 31 which are mounted in bearing brackets 32 secured to the container as best shown in Figure 2 of the drawings.

The plate 28 has one of the ends of a pair of spaced parallel rods 40 secured thereto and these rods are substantially U-shaped in formation for the purpose of receiving a bag 41 through the medium of hems 42 arranged in the top thereof. The bag 41 is disposed in the enlarged portion of the chamber when the apparatus is in normal position as shown in Figure 1, and in order to retain the plate 28 in its normal position against the pull of the weights 30, I provide a latch which includes a hook portion 43 normally engaging a flange of the plate as shown, and extending in opposed relation with respect to the hook portion 43 is a lever 44. The latch is pivotally secured by a pivot pin 45 and in a manner whereby the lever 44 thereof is disposed in the path of a block 46 of a timer mechanism of the apparatus. The block 46 is provided with a slot formed centrally therein and is mounted on an upright 47 having projections 48 staggeredly arranged thereon so as to retard the block in its downward movement as will be apparent, with the result considerable time is required for the block to descend from the top of the upright until it engages the lever 44 for moving the latch on its pivot and thereby releasing the plate which will of course be pulled and disposed above the compression chamber so as to cooperate with the piston head for squeezing the contents of the bag in a manner which will be presently described. In view of the fact that the rods 40 are loosely received in the hems 42 of the bag, it will be apparent that when the plate 28 is moved by its weight, the bag will be released from the rods.

In order to operate the piston and its head for pressing the bag against the plate 28 I have shown means for providing compressed air for this purpose, but I want it understood that any fluid pressure means may be provided, including hydraulic pressure and the like. In the form as shown, compressed air is adapted to be stored in a tank 49 having communication with a small portion of the compression chamber by a pipe 50 which has a control valve 51 arranged therein. The control valve is operated by the rod 52 having a knob 53 formed on its outer end thereof. The tank 49 is supplied with air by a pump 54 which includes an open top cylinder and a piston as shown. The pump is operated from the motor 21 through the medium of a chain 55 which drives a disk 56 having eccentrically mounted thereon a pin 57 for receiving the piston rod 58. A suitable check valve is provided for the tank 49 and this check valve is disposed in a pipe line 59 which is likewise disposed in communication with the small portion 23 of the compression chamber. A valve 60 is arranged in this pipe line 59 and this valve 60 is provided with an operating handle 61 which is controlled by a cam member 62 carried by the plate 28.

From the above description and disclosure of the drawings, it will be obvious that I have provided an apparatus for grinding fruit into pulp, with means for receiving the pulp and pressing the juice therefrom together with means for operating the same, and dispensing means for the juice.

When it is desired to operate the machine, the motor 21 is started, which puts the pump into operation for supplying the tank 49 with compressed air. The motor also operates the toothed rollers 17 for grinding the fruit into pulp which of course is disposed in the bag 41. The timing block is disposed in its uppermost position as shown in Figure 1 and by the time the block engages the lever 44, the bag has received sufficient pulp from the grinding roller 17. When the timing block engages the lever, it will of course dispose the latch to open position and release the plate 28 which will be arranged to cooperate with the piston head for pressing the juice from the pulp in the bag. When the plate is moved, the cam member 62 will operate the handle 61 and release compressed air from the tank 49 into the combustion chamber, and the air will operate the piston and its head. The pressing of the pulp in the bag will of course cause the juice from the pulp to pass into the container 4 through the medium of the openings of the enlarged portion of the combustion chamber and the juice can be dispensed from the container by the spigot 5.

The piston and its head is released by the control valve 51 which will allow the air to flow back into the tank 49.

The plate is provided with a handle 63 whereby it can be disposed to its normal position against the pull of its weights and when so disposed, the cam member 62 will engage the operating handle 61 and dispose the same to its closed position as shown in Figure 1.

The timing block 46 has arranged thereon plates 64 which may have printed or otherwise formed thereon words such as shown in Figure 5, and it will be noted that an upright 65 is disposed in parallelism with the upright 47 and this upright 65 has a block which likewise is provided with plates 64 having appropriate words or advertising matter thereon.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A fruit juice dispensing device comprising a platform, a container supported by said platform, a compression chamber arranged in and passing through said container, means for grinding fruit and disposed above the compression chamber, a plate mounted for movement, rods secured to said plate and normally overlying the compression chamber, a bag secured to said rods below the fruit grinding means and in the compression chamber, means for disposing said plate over the compression chamber and releasing said bag from the rods, means cooperating with said plate for pressing the contents of the bag, and dispensing means for said container.

2. A fruit juice dispensing device of the character described comprising a platform, a container supported thereby, a compression chamber disposed in said container and having a portion passing therethrough, a plate mounted for slidable movement and being provided with a recessed bottom, weights for moving said plate in one direction, a grinding means disposed above said compression chamber, rods secured to said plate and movable therewith, a bag adapted to be disposed in said compression chamber and supported by said rods, means for holding said plate in normal position, means for releasing said holding means to allow the plate to move over the compression chamber, a piston head mounted for movement in said compression chamber and cooperating with said plate for compressing the contents of said bag, said compression chamber being formed with openings to provide communication therebetween and the container and dispensing means for said container.

3. An apparatus of the character described comprising a container, an apertured compression chamber arranged in said container and including an enlarged portion and a small portion, a piston head mounted for slidable movement in the enlarged portion, a piston for operating the piston head and disposed in the small portion, a fruit grinding means disposed above the compression chamber, a plate mounted for movement, rods carried by said plate, a bag detachably secured to said rods and disposed in the enlarged portion of the compression chamber, means for releasing the bag from said rods and moving the plate to overlie the compression chamber so as to cooperate with the piston head for pressing the contents of the bag, and a spigot for said container.

4. An apparatus of the character described comprising a container, a compression chamber arranged in said container and including an apertured enlarged portion and a small portion, a piston head mounted for slidable movement in the enlarged portion, a piston disposed in the small portion for operating said piston head, compressed air means for operating said piston, a plate mounted for slidable movement, means for holding said plate in one position, means for disposing said plate in its other position and over the compression chamber, means for controlling compressed air to the compression chamber for operating the piston and its head and means for releasing the plate holding means and compressed air controlling means simultaneously as and for the purpose specified.

5. An apparatus of the character described comprising a container, a perforated chamber disposed in said container, a fruit grinding means arranged above the chamber, a bag holding means including substantially U-shaped rods, a bag formed with hems receiving said rods, a plate mounted for slidable movement and carrying said rods, means for moving said plate to position the same over the perforated chamber and releasing the bag from the rods respectively, means for holding said plate in its normal position, timing mechanism for releasing said plate and means cooperating with said plate for pressing the contents of said bag.

6. An apparatus of the character described comprising a container, dispensing means for said container, a compression chamber arranged in said container and being provided with perforations, grinding means disposed above said compression chamber, a piston head mounted for reciprocation in said chamber, a rod depending from said piston head, a piston secured to said rod, means for holding a bag below said grinding means and in the compression chamber, means carrying the bag holding means and adapted to release the bag therefrom, and cooperate with the piston head for pressing the contents of said bag as and for the purpose specified.

7. An apparatus of the character described comprising a container, dispensing means for said container, a compression chamber including an enlarged portion arranged in said container and a small portion passing through the bottom thereof, said enlarged portion being provided with openings, a fruit grinding means supported above the compression chamber, a bag for receiving ground fruit from the fruit grinding means and being arranged in the enlarged portion of the compression chamber, a piston head mounted in the enlarged portion of the compression chamber, a piston for operating said piston head, means for supporting said bag and being releasable therefrom, means carrying the supporting means and being movable, said bag being released from its supporting means when the carrying means is moved in one direction, means for moving the carrying means over the compression chamber and simultaneously releasing the bag from the supporting means whereby the carrying means will be likewise disposed over the bag when the latter is released from its supporting means, means for holding the carrying means in its inoperative position, time controlled mechanism for releasing the carrying means and means operated upon movement of the carrying means for operating the piston and its piston head accordingly for pressing the contents of the bag against the carrying means.

8. An apparatus of the character described comprising a container, a compression chamber arranged in said container and having a perforated portion, a piston head mounted in said compression chamber, a piston for operating the same, a grinding mechanism disposed above the compression chamber, means for supporting a bag in said compression chamber below the grinding mechanism, means for carrying the bag holding means and for releasing the bag therefrom, means for arranging the carrying means over the compression chamber, a time controlled means for releasing the carrying means, a pump, a tank in communication with said pump and compression chamber respectively, and a valve operated by and upon movement of the carrying means for releasing air from said tank for operating said piston and its head for cooperating with said carrying means for pressing the contents of said bag.

9. An apparatus of the character described comprising a container, means for grinding fruit, perforated means for receiving the ground fruit and being disposed below the fruit grinding means and in the container, a bag in the ground fruit receiving means, means for supporting the bag, means for carrying the bag supporting means and being movable to release the bag from said supporting means, and means for pressing the bag and its contents against the carrying means when the bag is released.

In testimony whereof I affix my signature.

RALPH VAN DUZER.